United States Patent [19]
Kropelnitski

[11] 3,907,113
[45] Sept. 23, 1975

[54] MULTIPLE BICYCLE SUPPORT SYSTEM
[76] Inventor: Edward Kropelnitski, 5409 Perry Rd., Grand Blanc, Mich. 48439
[22] Filed: Nov. 12, 1974
[21] Appl. No.: 523,142

[52] U.S. Cl................................ 211/19; 214/16.4 A
[51] Int. Cl.[2]............................................ A47F 7/04
[58] Field of Search............ 211/17, 18, 19, 20, 21, 211/22; 214/16.1 R, 16.1 EC, 16.4 A; 294/81 R, 67 D, 67 DA; 224/42.03 R, 42.03 A, 42.03 B

[56] References Cited
UNITED STATES PATENTS
| | | | |
|---|---|---|---|
| 650,663 | 5/1900 | Whitcher | 211/18 |
| 1,232,501 | 7/1917 | Colen | 211/19 |
| 3,664,534 | 5/1972 | Hunter | 214/16.4 A |
| 3,770,133 | 11/1973 | Kolker | 211/19 |

FOREIGN PATENTS OR APPLICATIONS
| | | | |
|---|---|---|---|
| 17,627 | 9/1898 | Switzerland | 211/18 |
| 124,980 | 3/1949 | Finland | 211/19 |

*Primary Examiner*—Roy D. Frazier
*Assistant Examiner*—Robert A. Hafer
*Attorney, Agent, or Firm*—Basile and Weintraub

[57] ABSTRACT

A multiple bicycle support system comprising a plurality of horizontally spaced, vertically disposed rails, each of which slidably supports a bicycle support mechanism which is selectively engagable by a pulley assembly carrying a cable adapted to raise the bicycle support mechanism to a selected height along its associated bicycle support rail. One of the pulleys supporting the cable is horizontally movable and positionable with respect to each of the rails such that only one pulley assembly is required to raise a plurality of bicycle support mechanisms.

5 Claims, 6 Drawing Figures

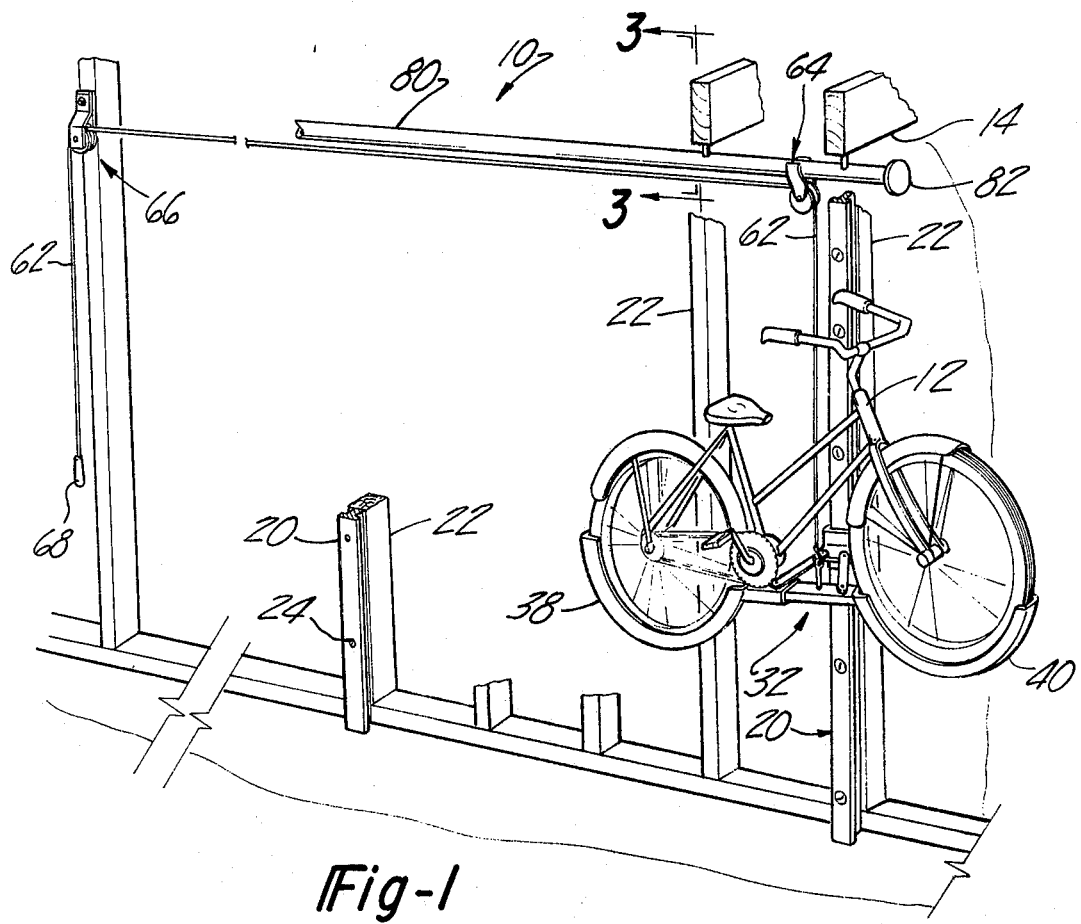
Fig-1
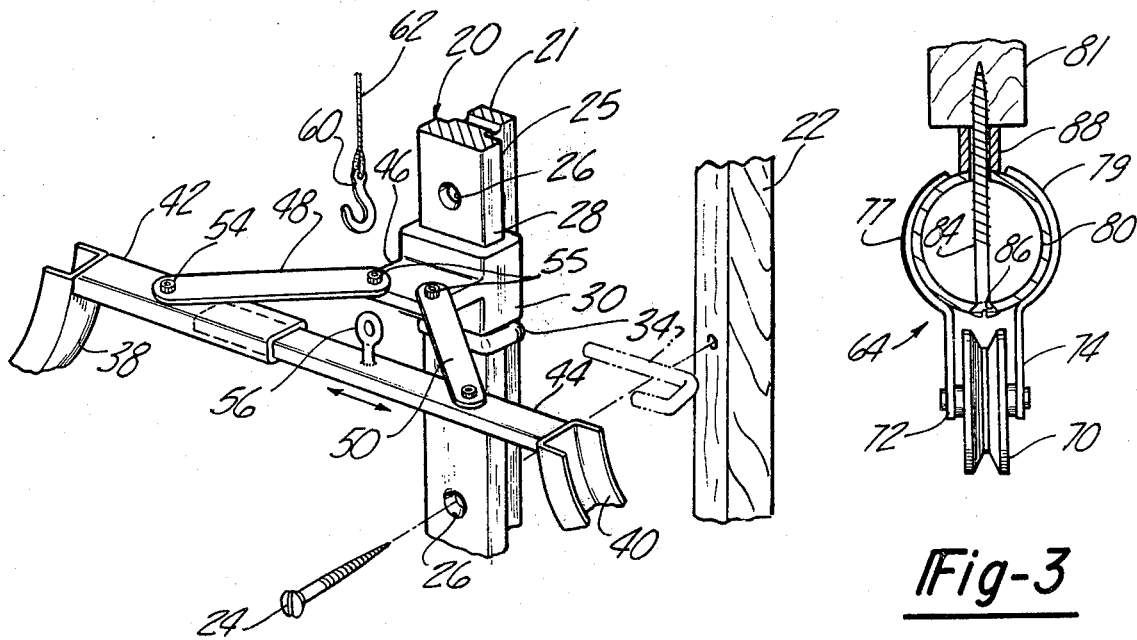
Fig-2
Fig-3

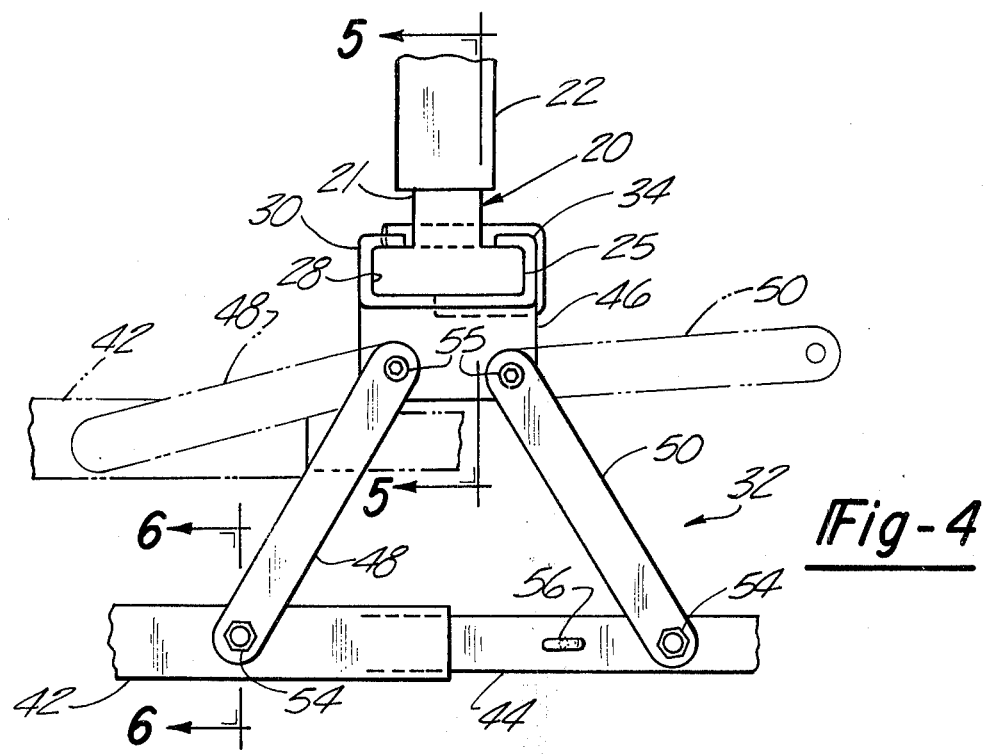
Fig-4
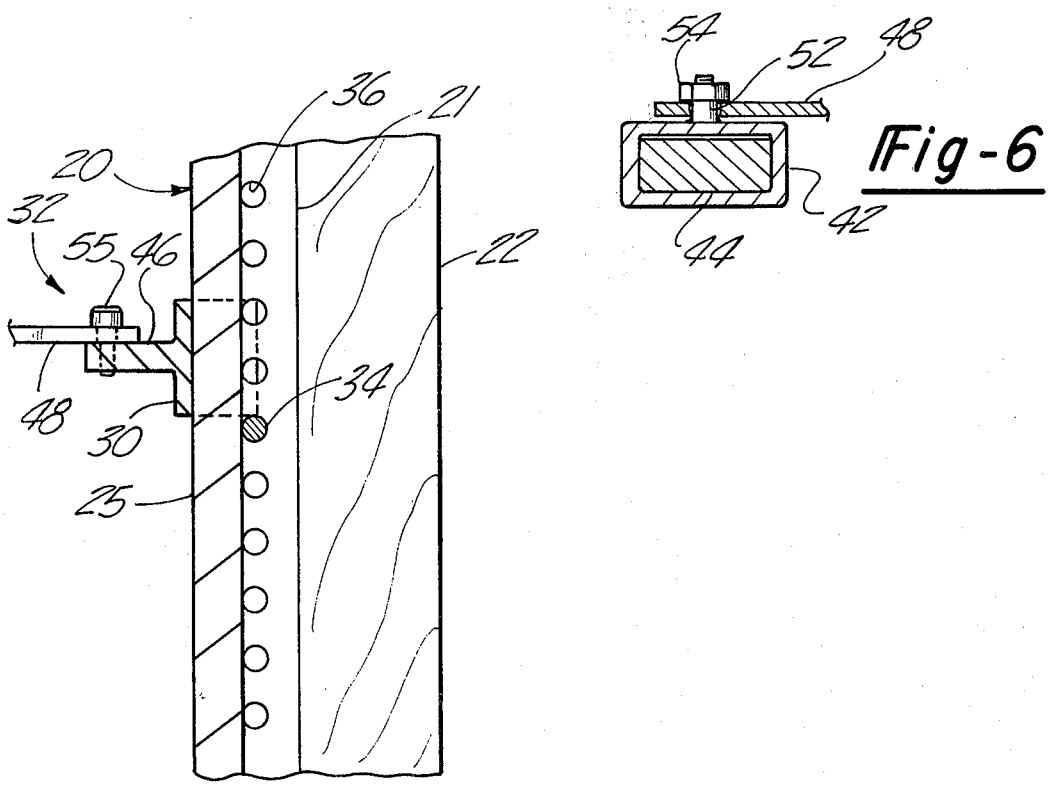
Fig-6
Fig-5

MULTIPLE BICYCLE SUPPORT SYSTEM

BACKGROUND OF THE INVENTION

1. Field of the Invention

The present invention relates to the safe support and storage of a plurality of bicycles and, in particular, the present invention relates to a system employing an apparatus for raising one or more bicycles to an above-ground position for indoor storage.

2. Background of the Invention

Heretofore, numerous devices and apparatus have been employed for suspending a bicycle from the ceiling of a building in order to enable the bicycle to be protected from damage by contact with other articles and to permit the floor space below the bicycle to be utilized for the storage of other articles.

Examples of such prior art devices and apparatus are disclosed in U.S. Pat. Nos. 586,681, 579,584, 613,773, 618,999, 3,464,608 and 3,504,831; Swiss Pat. No. 17,627 and British Pat. No. 4281.

While each of the aforementioned patents has suggested devices and apparatus for the holding and securing of a bicycle in such a manner as to prevent any possibility of the shifting of the bicycle after the same has been raised and stored in the ceiling position to permit the occupying of the floor space therebelow, such devices and apparatus do not provide a means by which a plurality of bicycles may be simply and independently stored with an economy of components.

SUMMARY OF THE INVENTION

The present invention which will be described subsequently in greater detail, comprises a system for the mounting of a plurality of bicycles for suspension from the ceiling or roof of a building, such as a garage, to enable the storage of the bicycle in a safe manner by preventing contact with other articles and to permit the floor space below the bicycle to be utilized for the storage of other articles.

It is therefore a primary object of the present invention to provide a new and improved bicycle ceiling support means.

It is a further object of the present invention to provide a new and improved bicycle support for the independent elevation of a plurality of bicycles for suspension from the ceiling or roof of a building to permit the utilization of the floor space beneath the bicycles.

Other objects, advantages and applications of the present invention will become apparent to those skilled in the art of bicycle supports when the accompanying description of the best mode contemplated for practicing the invention is read in conjunction with the several drawings.

BRIEF DESCRIPTION OF THE DRAWINGS

The description herein makes reference to the accompanying drawings wherein like reference numerals refer to like parts throughout the several views and in which:

FIG. 1 is a perspective view of a bicycle support system constructed in accordance with the principles of the present invention illustrating a bicycle suspended above the floor of a building;

FIG. 2 is a fragmentary enlarged perspective view of one of the bicycle support mechanisms utilized in the system illustrated in FIG. 1;

FIG. 3 is a fragmentary enlarged cross-sectional view taken along line 3—3 of FIG. 1;

FIG. 4 is a fragmentary top elevational view of the bicycle support mechanism illustrated in FIG. 2;

FIG. 5 is an enlarged fragmentary cross-sectional view of the bicycle support mechanism taken along line 5—5 of FIG. 4; and FIG. 6 is a fragmentary cross-sectional view of the bicycle support mechanism taken along 6—6 of FIG. 4.

DESCRIPTION OF THE PREFERRED EMBODIMENT

Referring now to the drawings and, in particular, to FIG. 1 wherein there is illustrated one example of the present invention in the form of a bicycle 12 in close proximity of the ceiling 14 of a building, such as a garage, such that the floor space of the building, beneath the bicycle 12 may be utilized for the storage of other materials and articles when the bicycles 12 have been elevated to a raised position adjacent the ceiling 14.

As can best be seen in FIGS. 1 and 2, the system 10 comprises a plurality of horizontally spaced, vertically disposed, T-shaped rails 20, each having a bottom wall surface of a leg section 21 in abutment with a wooden stud 22 of the wall of the garage 16. The rails 20 are fastened to the wooden 22 studs 21 by means of elongated screws 24 (FIG. 2) that extend through a plurality of vertically spaced apertures 26 within the T-shaped rail 20 and into the studs 22. The base section 25 of each T-shaped rail 20 defines a guide way 28 which slidably supports a C-shaped bracket 30 that forms a portion of an individual bicycle support mechanism 32 which, in turn, is freely slidable up and down the full length of the rail 20. The mechanism 32 may be securily fixed at any desired vertical position by means of a pin 34 which is insertable through any one of a plurality of vertically disposed slots 36 (FIG. 5) extending laterally through the leg portion 21 of the rail 20 such that after the bracket 30 is positioned at its desired vertical location, pin 34 is insertable through one of the slots 36. The abutment of the bottom wall of the bracket 30 with the pin 34 prevents further downward movement of the bracket 30 and thus, the individual bicycle support mechanism 32 is selectively positionable at any desired height.

The bicycle support mechanism 32 further comprises a pair of semicircular shaped wheel supporting channel members 38 and 40 which are longitudinally spaced from each other and telescopically connected by means of a tubular member 42 projecting from the upper edge of the channel member 38 and a support member 44 extending from the upper edge of the channel member 40. The outer end of the tubular member 42 telescopically receives the end of the support member 44 such that the two wheel support members 38 and 40 may be moved toward and away from each other, as desired, and by so adjusting their distance the two wheel supporting members 38 and 40 may support different sized bicycles 12 having wheels that are spaced at different distances from one another. Thus, the same basic unit may support a small bicycle by bringing the wheel supporting members 38 and 40 closer to one another or, alternately, by moving the two wheeled members 38 and 40 away from each other, larger sized bicycles may be mounted.

As can best be seen in FIGS. 2, 4 and 6, the members 42 and 44 are, respectively, connected to a flange 46 on the bracket 30 by means of connecting members 48 and 50. Suitable securing means, such as bolts 52 welded to the members 42 and 44 and engagable by nuts 54 as clearly iullustrated in FIG. 6 attach the ends of the connecting members 48 and 50, respectively, to the members 42 and 44. Similarly, threaded fasteners 55 (FIG. 5) pass through bores in the other ends of the connecting members 48 and 50 into threaded bores in the flange 46 on bracket 30 to attach the connecting members thereto. Sufficient clearance between the several aforementioned members is provided to insure a relative rotational movement between the connecting members 48 and 50, the flange 46 on the bracket 30 and the telescopically engaging members 42 and 44. This permits the wheel supporting channels 38 and 40 to be moved toward and away from each other with ease while, at the same time, permitting the entire mechanism 32 to be pushed backwardly in close proximity to the rail 20 when the device is not used and storage of the same is desired such as shown in FIG. 4 of the drawings in phantom lines.

Once the wheel supporting elements 38 and 40 have been fixed with respect to each other and the bicycle 12 positioned therein, the bicycle 12 itself maintains the wheel supporting elements 38 and 40 at their proper distance. At the same time, suitable means not shown may be utilized to secure the bicycle 12 to the bicycle support mechanism 32.

As can best be seen in FIG. 2, the bicycle support element 32 is provided with an eye flange 56 that is attached by any suitable means, such as welding or the like, to the support member 44 and is adapted to be releasably secured to a hook 60 carried on the end of a cable 62 which, in turn, is supported at the ceiling by a movable pulley assembly 64 (FIG. 3) and a fixed pulley assembly 66. The other end of the cable 62 has a handle 68 or other suitable means to permit the grasping of the cable 62 so as to raise and lower the bicycle support mechanism 32.

As can best be seen in FIG. 1 as the cable 62 is raised, the bicycle mechanism 32, and thus the bicycle 12, may be raised to a position wherein the bicycle 12 is in close proximity of the ceiling whereupon the pin 34 may be inserted through one of the slots 36 closest to the bracket 30 so as to lock the entire bicycle support mechanism 32 at the desired elevated position. Whereupon tension on the cable 62 may be relieved and the hook 60 may be disconnected from the eye 56 on the bicycle support mechanism 32.

As can best be seen in FIG. 3, the movable pulley assembly 64 comprises a pulley 70 which is rotatably mounted between a pair of a brackets 72 and 74 which, respectively, have arcuately shaped upper ends 77 and 79 following the circular contour of a horizontally disposed support rod 80. The circular or arcuate contoured sections 77 and 79 on the brackets 72 and 74 are so designed as to permit the slidable movement of the moveable pulley assembly 64 along the full length of the support rod 80, yet when a downward force is exerted on the movable pulley 70 such as when raising or lowering a bicycle 12, the assembly 64 tilts slightly into a locking position so as to restrain further movement of the movable pulley assembly 64 with respect to the support rod 80 thereby permitting the raising and lowering of the bicycle 12 without concern for the movement of the pulley assembly 64. Yet when no tension is exerted on the pulley assembly 64, the same may be easily moved across the full length of the rod 80 so as to be positionably adjacent, and immediately in front of, any number rails 20, so that other bicycles may be raised and lowered by the same movable pulley assembly 64.

As can best be seen in FIGS. 1 and 3, the support rod 80 is an elongated circular member provided with stops 82 at each end to prevent the accidental withdrawal of the movable pulley assembly 64 from the rod 80. The support rod 80 is attached to the beams 81 in the ceiling 14 by any suitable means, but preferably by means of elongated fastening members 84 that extend through apertures 86 in the support rod 80 through a spacer section 88 on the top portion of the support rod 80 and into the ceiling beams, as shown in FIG. 3.

The fixed pulley assembly 66 may be provided with a conventional locking mechanism (not shown) of the type available in most hoists to permit the temporary locking of the cable 62 after the bicycle 12 has been raised to its desired elevational position to permit the insertion of the pin 34 within the desired aperture 36 to securely fix the bicycle 12 at its desired elevated position.

It can thus be seen that the present invention has provided a new and improved bicycle support which is adapted to raise a plurality of bicycles for suspension from the ceiling of a building so as to permit the use of the floor beneath the elevated bicycles, yet one which requires only one simple means for raising and lowering the bicycles.

Although only one embodiment of the present invention has been disclosed, it should be apparent to those skilled in the art of bicycle supports for elevating bicycles for support in close proximity to a ceiling that other forms may be had all coming within the spirit of the present invention and the scope of the appended claims.

What is claimed is as follows:

1. A multiple bicycle support comprising a plurality of horizontally spaced rails disposed on a vertical wall;
   bicycle support means slidably carried by each of said rails;
   a first pulley fixedly mounted to said vertical wall at a position horizontally spaced from the last of said plurality of rails;
   a second pulley mounted above said rails and slidably movable so as to be selectively positioned adjacent to any one of said rails;
   a cable carried by said pulleys having means at one end for engaging, selectively, each of said bicycle support means so as to raise said bicycle support means along its associated rail to a desired position; and means carried by said associated rail for locking said bicycle support means at said raised position.

2. The multiple bicycle support defined in claim 1 wherein said bicycle support means further comprises means to permit said bicycle support to be moved inwardly and outwardly with respect to its associated vertically disposed rail.

3. The bicycle support defined in claim 2 wherein said cable means is releasably attachable to each of said bicycle support means.

4. The bicycle support defined in claim 2 further comprising means for releasably securing said bicycle to said bicycle support means.

5. The bicycle support defined in claim 2 further comprising means which support the rails of said bicycle, said bicycle wheel support means each having tubular portions which telescopically engage each other to provide for adjustment in the horizontal spacing between said wheel support, such that said wheel supports are adapted to support a plurality of differently sized bicycles.

* * * * *